United States Patent [19]

Doster et al.

[11] Patent Number: 4,597,976
[45] Date of Patent: Jul. 1, 1986

[54] PROCESS FOR PRODUCING SHELF STABLE PASTA CONTAINING PRODUCT

[75] Inventors: Robert C. Doster, Van Nuys; Karen F. Kahn, Simi Valley, both of Calif.

[73] Assignee: Nestec S.A., Vevey, Switzerland

[21] Appl. No.: 558,907

[22] Filed: Dec. 7, 1983

[51] Int. Cl.⁴ .............................. A23L 3/00; A23L 1/16
[52] U.S. Cl. ..................................... 426/325; 426/401; 426/557; 426/131
[58] Field of Search ............... 426/557, 558, 451, 325, 426/326, 310, 131, 401

[56] References Cited

U.S. PATENT DOCUMENTS 4,394,397  7/1983  Lometillo et al. .................. 426/451

FOREIGN PATENT DOCUMENTS 0007725  3/1976  Japan ................................. 426/557
0148526  12/1978 Japan ................................. 426/557
206350  12/1982  Japan ................................. 426/557

OTHER PUBLICATIONS

Lueck (Director) *The Canned Food Reference Manual*, 2nd Ed. American Can Company, N.Y., 1943, pp. 448–450.

*Primary Examiner*—Raymond N. Jones
*Assistant Examiner*—Elizabeth A. King

[57] ABSTRACT

Pasta containing products are formulated and produced under conditions which enable the product, when packed in sealed containers, to be thermally processed under conditions which render the product commercially sterile, but do not adversely affect the texture, taste or appearance of the product. The pasta and each of the other components of the product, such as meat and sauce, are formulated and/or processed to have an equilibrium pH of less than 4.6, and are hot filled into containers, which after sealing do not require retorting, but are heat processed under conditions to provide a sterilizing value equivalent to about 10 minutes at 200° F. to render the product commercially sterile. Pasta containing products such as spaghetti with meat sauce, beef ravioli with meat sauce, and the like, produced in accordance with the present invention, have a firmness and texture superior to conventionally retorted pasta products.

9 Claims, No Drawings

PROCESS FOR PRODUCING SHELF STABLE PASTA CONTAINING PRODUCT

BACKGROUND OF THE INVENTION

This invention relates to the production of pre-cooked, shelf stable, pasta-containing products, such as, for example, spaghetti with meat sauce, spaghetti with meatballs, beef or cheese ravioli in sauce, lasagna, cannelloni, and the like. More particularly, the invention relates to the production of novel hydrated pasta-containing products, which are thermally processed under relatively mild conditions to render the products commercially sterile without adversely affecting the texture, taste, color or appearance of the pasta or other components of the products.

As used herein, the term "commercially sterile" means (a) the absence of microorganisms capable of growing in and spoiling the food under normal non-refrigerated storage conditions, and (b) the absence of pathogenic microorganisms capable of proliferating in the food.

Conventional pasta products, such as macaroni, spaghetti, noodles and the like, consist basically of dough made with one or more of semolina, farina, or flour, and water, which is formed under pressure into a variety of sizes and shapes, are dried to a moisture content of 12% or less to obtain a hard product. At such moisture levels, the product will not support the growth of mold, yeast or other spoilage microorganisms, so that the products, if kept dry, can be stored without refrigeration for long periods of time. Dried pasta products are prepared for consumption by cooking in boiling water for about 8 to 15 minutes to rehydrate and soften the pasta and provide it with a desirable firm, slightly chewy texture.

In order to facilitate the use of pasta products by consumers in the home, many pasta products are pre-cooked and provided in canned form, together with tomato sauce, meat sauce, gravy, meatballs, and the like. The production of such canned pasta-containing products typically includes the steps of blanching dried pasta in boiling water to hydrate and soften the pasta, with the hydrated pasta containing about 70%–75% by weight of water, filling the pre-cooked pasta into cans together with sauce, meat, and the like, sealing the cans and retorting the sealed cans under time-temperature conditions sufficient to provide a commercially sterile product. Since the pasta, upon hydration, has a moisture content which will support the growth of spoilage organisms, the canned pasta-containing products must be subjected to relatively severe heat processing conditions in order to produce a commercially sterile product. For example, canned spaghetti in 300×407 cans typically is heat processed at 240° F. for 55 minutes. However, subjecting the canned pasta to such high temperature-long time heat processing reduces the desired firm texture of the pasta, causing it to become soft and mushy. The taste and texture of the resulting retorted product is undesirable to many consumers and has limited the acceptability of canned pasta-containing products.

SUMMARY OF THE INVENTION

The present invention provides for the production of hydrated pasta-containing products, which are formulated in such a manner so as to allow the product, when packed in sealed containers, to be heat processed under relatively mild atmospheric conditions, rather than by retorting, in order to produce a commercially sterile product which may be stored under non-refrigerated conditions. Since the product is not subjected to the severe time-temperature conditions required in retorting, the pasta component of the product retains a firm texture and appearance characteristic of freshly cooked pasta products, without becoming soft and mushy.

Typically, the product of this invention contains three components, namely, a pasta component, a meat component, and a sauce component. Each of these components is formulated and/or processed to have an equilibrium pH of less than 4.6 so that the growth of microorganisms and $C.$ $botulinum$ spores is prevented and the product may be processed at the temperature of boiling water or less, such as by using a hot fill-hold procedure, to render it commercially sterile. Thus, in preparing the pasta component, a food grade acid is included in the ingredient mixture used to form the pasta dough which is formed under pressure into the desired size and shape. The meat component is prepared by blanching ground meat particles in a hot acid solution with the acidified meat being used as a separate component of the product or being included in the sauce component of the product. The sauce component is prepared by either the use of a food grade acid and/or through the use of high acid foods. The sauce component must be formulated so that it not only has a pH of less than 4.6, but also has a viscosity such that, when filled into containers, it completely surrounds the other components of the product.

In producing the product of the present invention, the components are heated to a temperature of at least about 185° F. and, while at such an elevated temperature, filled into suitable containers, such as glass jars, cans, and the like, which are then sealed. Since each of the components has a pH of less than 4.6, the sealed product containers require only relatively mild thermal processing in order to render the product commercially sterile, such as heating the sealed containers in hot water or steam at about 190° F. for 13 minutes.

The reduced heat processing necessary to achieve commercial sterility results in substantially less loss of texture in the pasta component than is usually found in canned pasta products which have been retorted, with the texture and appearance of the pasta component of the present product closely resembling that of freshly prepared cooked pasta.

DESCRIPTION OF PREFERRED EMBODIMENTS

As discussed hereinabove, each of the components of the product of this invention is formulated and/or processed to have an equilibrium pH of less than 4.6. The acidified pasta component of the product is prepared by mixing a food grade acid, preferably in dry form, with a farinaceous ingredient and water, with or without one or more additives, to form a dough, and forming the dough under pressure into a variety of sizes and shapes, such as spaghetti, macaroni, noodles and the like. The farinaceous ingredient may be one or more of semolina, durum flour, farina or flour, depending on the type of pasta product desired. Generally, semolina and durum flour are preferred for extruded pasta, such as spaghetti, macaroni, etc., while durum or wheat flour are preferred for sheeted pasta, such as noodles. The farinaceous ingredient is usually present in an amount of from 70 to 95% of the dry ingredient mixture, with amounts of than 4.6, preferably between 80%—90% by wt. of the dry mix being preferred.

Wheat gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks and/or whole eggs, may if desired, be included in the ingredient mix at levels up to about 22% by weight of the dry ingredient mix. Dried eggs and dried yolks generally are used in the production of noodles, while dried egg whites are generally used in the production of extruded pasta. In addition, glyceryl monostearate may, if desired, also be included in the ingredient mix, particularly in the production of extruded pasta, to improve firmness, reduce stickiness and minimize absorption of water from the sauce component by the pasta. If used, the glyceryl monostearate preferably is present in amounts of from 0.5 to 5% by weight of the dry ingredient mix. It is to be understood that wheat gluten, eggs, and glyceryl monostearate are optional ingredients in the dry mix and are not essential in the production of the pasta component.

Sufficient food grade edible acid is included in the ingredient mix to provide the formed pasta with a pH of less than 4.6, preferably between 4.0 and 4.4. Any acid, organic or inorganic, which is suitable for use in foods and which is soluble in water may be used, such as citric, fumaric, lactic, malic, tartaric, sulfuric, hydrochloric and phosphoric acids. The acid used must not impart to the pasta a taste which is incompatible with the other components of the product at the desired pH level. Malic acid and citric acid have been found to be particularly well suited for use in acidification of the pasta component.

The pasta component is formed by blending the dry ingredients, typically the farinaceous ingredient, dehydrated egg material, wheat gluten, and food grade acid, with or without glyceryl monostearate, and adding sufficient water to form a suitable dough. Generally, water is added to the dry mix in such quantity as to produce a dough containing from about 25% to 38% moisture. The resulting dough is kneaded and formed under pressure, using conventional procedures, to form a pasta component having the desired size and shape. For example, in the production of acidified spaghetti, the dry ingredients are mixed, formed into a dough containing 30%-32% moisture, kneaded and extruded through a die in a conventional continuous auger extruder to form a continuous cord-shaped extrudate about 0.06 inch to 0.11 inch in diameter. The extrudate, which has a moisture content of about 30%-32%, may either be cut into desired lengths and used directly in the production of the product of the present invention, or initially dried to a moisture content of about 12% by conventional procedures and cut into desired lengths for subsequent use in producing the product. Similarly, in the production of ravioli, an acidified dough having a moisture content of 30%-36% is prepared by mixing the dry ingredients and water and the dough is formed into sheets about 0.10 to 0.20 inch in thickness, in a standard macaroni press. The sheeted dough is then loaded into a conventional ravioli machine, together with acidified ravioli meat filling prepared as described hereinbelow and formed into individual meat filled ravioli pieces.

The acidified meat component may be incorporated into the product of the present invention in a variety of forms, such as formed meatballs, as a meat filling in ravioli and/or as an addition to the sauce component. Generally it is preferred to prepare the acidified meat component by grinding cooked meat pieces through a $\frac{1}{8}$inch -$\frac{1}{4}$inch grid and blanching the ground meat particles in a hot aqueous acid solution having a pH of below about 3.5 for a period of time sufficient to reduce the pH of the meat particles to less than 4.6, typically 4.3–4.4. Any of the food grade acids discussed above may be used in preparing the acid solution. The time required to reduce the pH of the meat to the desired level will vary depending upon the size of the meat particles, the pH of the acid solution and the temperature of the acid solution.

The acidified ground meat particles typically are used as a meat filling for ravioli and/or as a component of the sauce, as described more fully hereinbelow. Thus, in the production of beef raviolis, acidified ground beef is mixed with other ingredients, such as cheese, crackers, bread crumbs, seasonings, spices and water to provide an acidified meat filling having a pH below 4.6, which is loaded into a conventional ravioli machine, together with acidified sheeted dough, and formed into individual meat filled ravioli pieces comprising about 60%-70% by weight pasta and 30%–40% by weight meat filling, with the ravioli pieces preferably having a pH of no more than about 4.4.

The meat component may also be acidified by incorporating in a meat emulsion, an encapsulated acid, that is an edible acid coated with an edible fat having a melting point of above room temperature, but below about 150° F., generally between about 126° F.-135° F. This method of meat acidification is particularly well suited when it is desired to incorporate meat in the product in the form of relatively large pieces having a separate identity, such as meatballs, sausage, and the like. According to this procedure, an encapsulated acid, such as malic acid coated with a 135° F. melting point fat, is added to a meat emulsion containing meat, fillers such as cracker meal or bread crumbs, and binders such as soy protein concentrate, at a level of from about 0.75%-2.5% of the emulsion, and the emulsion is heated at about 135° F.-150° F. for 90 minutes. The meat emulsion is then formed into the desired shape, such as meatballs, and cooked for about 10 minutes to set the emulsion and release the remainder of the acid into the meat emulsion, which has a final pH of less than 4.5.

The nature of the sauce component will depend upon the type of product desired and the condiments included therein, and may contain ingredients such as spices, for example, oregano, parsley, basil; flavorings, for example, garlic, pepper, onion; corn syrup; vegetable oil; salt; and the like. Of course, the ingredients used and the amounts of ingredients will be determined by the taste desired for the sauce component. The important characteristics of the sauce component are that it have a pH of less than 4.6, have a taste which is compatible with an acid pH and with the other components of the product, and have a viscosity such that the sauce surrounds the other components of the product when packed in containers. The desired acidity may be provided in the sauce component by the inclusion therein of any of the food grade acids disclosed above, and/or an acid food, such as tomato paste, or tomato sauce. Since tomato products have both a taste which is compatible with many pasta products and a pH of less than 4.6, it is generally preferred to use tomato sauce or paste, with or without additional food grade acids, as an acid food in the preparation of the sauce component. Other ingredients of the sauce are determined by the taste desired and include corn syrup, vegetable oil, seasoning and spices, together with sufficient water to provide the sauce with the desired viscosity.

In accordance with one embodiment of the present invention, the acidified meat component is included in the sauce. For example, an acidified meat sauce having a pH of less than 4.6, preferably between 4.3 and 4.4, is prepared by blanching particles of ground meat in a hot acid solution having a pH of about 3.5 or below, and then adding the remaining ingredients of the sauce to the hot acid solution to form the meat sauce.

The acidified pasta and meat components are combined in a suitable container with the acidic sauce so that the sauce surrounds the pasta and meat components in the container. While the procedure used in filling the components into the container may vary, it is necessary that each of the components be at a temperature of about 185° F. or above when filled into containers.

The pasta component filled into containers may either be freshly prepared, undried pasta, or it may have been previously prepared and then dried or frozen for storage and subsequent use. If previously prepared, the pasta is hydrated and heated, preferably in two steps, such as by first heating in boiling water for 2–10 minutes, and then heating in a steam blancher at a temperature of 190° F. or above for about 5–15 minutes just prior to filling into the containers.

The components, each of which has a pH of less than 4.6 and is at a temperature of 185° F. or higher, are filled into suitable containers, such as cans, glass jars, and the like, so that the pasta and meat components are surrounded by the sauce. The filled containers are then sealed and heat processed to render the product commercially sterile. In accordance with the present invention, the containers are heat processed under atmospheric conditions which provide a sterilizing value equivalent to 10 minutes at 200° F. For example, a commercially sterile product is produced by processing the sealed containers for 13 minutes in hot water or steam at 190° F., when the components are filled into the containers at a temperature of 185°–190° F. Upon completion of heat processing, the containers are rapidly cooled to a temperature of about 110° F. or below in order to preserve the texture of the products.

The pasta-containing product of the present invention is commercially sterile and requires no refrigeration, with the pasta having a desirable firm texture and appearance.

The following examples are given to illustrate, but not to limit, the present invention. In these examples, and elsewhere herein, proportions and percentages are expressed as parts by weight unless otherwise indicated.

EXAMPLE I

A spaghetti with meat sauce product is prepared in accordance with the present invention by the following procedure.

The pasta component is prepared by dry blending

| Ingredient | % by weight |
| --- | --- |
| durum flour | 82.4% |
| dehydrated egg white | 8.0 |
| wheat gluten | 7.4 |

| Ingredient | % by weight |
| --- | --- |
| malic acid | 1.1 |
| glyceryl monostearate | 1.1 |

The dry mix is transferred to a conventional continuous macaroni press and water is added, with mixing, to form a dough having a moisture content of about 31%. The dough is kneaded and vacuumized to remove occluded air bubbles and extruded through a die having openings 0.072 inch in diameter to form continuous strands of spaghetti. The spaghetti strands thus formed are dried at 90° F. for about 48 hours to reduce their moisture content to about 12%, and are cut into pieces about 10–12 inches in length. The acidified spaghetti thus formed has a pH of about 4.3.

The meat sauce component is prepared by the following formulation.

| Ingredient | % by weight |
| --- | --- |
| Water | 54.9% |
| Beef | 19.2 |
| Tomato paste, 31% | 17.5 |
| Corn syrup | 4.6 |
| Cottonseed oil | 1.1 |
| Salt | 0.9 |
| Citric acid | 0.2 |
| Flavorings, spices | 1.6 |

The meat is ground two times through a ¼ inch grid, and is then added to a boiling solution of the citric acid and water having a pH of below 3.5, with the resulting meat slurry being heated to boiling for 1 minute. The remainder of the sauce ingredients are then added to the hot acidified meat slurry, with the resulting meat sauce, which has a pH of about 4.3, being maintained at a temperature of at least 195° F.

In producing the product, the dried spaghetti is heated in boiling water for 5 minutes to hydrate and cook the spaghetti, after which the spaghetti is rinsed, drained and heated in a steam blancher at a temperature of above 195° F. for 5 minutes to heat the spaghetti to a temperature of at least 185° F. The spaghetti, while at a temperature of at least 185° F., is filled into 16 oz. glass jars, and the meat sauce, which also has a temperature of at least 185° F., is added to the jars in an amount sufficient to provide a ratio of about 16 parts of spaghetti per 100 of meat sauce, so that the meat sauce completely covers the spaghetti. The filled jars are then sealed, inverted and headed in hot water or steam at a temperature of at least 190° F. for 13 minutes. The jars are then cooled to 110° F. or below by quenching in water.

The resulting product is commercially sterile, with the product having a mass average pH of about 4.47 immediately after production, and about 4.45 after 24 hours. The spaghetti has a firm, freshly cooked texture and appearance.

EXAMPLE II

A meat ravioli with meat sauce product is prepared in accordance with the present invention by the following procedure:

The pasta component is prepared using the following dry ingredients:

| Ingredient | % by weight |
|---|---|
| durum flour | 91.2% |
| wheat gluten | 5.0 |
| egg white solids | 3.0 |
| malic acid | 0.8 |

The dry ingredients are blended in a paddle mixer for 10 minutes and water is added in an amount of about 36 parts by weight water per 100 parts by weight of dry ingredients, to form a dough having pH of about 4.3. The dough is formed into sheets about 0.16 inch thick on a conventional sheeter-kneader, and the pasta sheets are then formed into rolls.

An acidified meat filling for the ravioli is formed using the following ingredients:

| Ingredient | % by weight |
|---|---|
| cooked meat dices | 38.8% |
| whole eggs | 19.4 |
| water | 20.5 |
| cracker crumbs | 10.7 |
| cheese | 6.8 |
| salt | 1.2 |
| malic acid | 0.9 |
| flavoring, spices | 1.7 |

The cooked meat dices are ground through a ⅛ inch grid. To this is added a solution of the malic acid in about ¼ of the water of the formulation, and the resulting meat slurry mixed for about 10 minutes. The eggs and the remaining filling ingredients are then mixed into the meat slurry to provide an acidified meat slurry having a pH of about 4.35. The rolls of sheeted dough and the acidified meat filling are loaded into a conventional ravioli machine and formed into ravioli pieces, about 1"square, containing about 38% by weight of the meat filling.

An acidified meat sauce having a pH of about 4.3 is prepared in accordance with the formulation and procedure used in Example I, except that the sauce is formulated to have a meat content of about 7%–8%, and the meat sauce is heated to a temperature of at least 195° F.

In producing the product, the ravioli pieces are blanched in boiling water for several minutes, and are then heated in a steam blancher at a temperature of at least 190° F. for 5 minutes, so that the temperature of the ravioli pieces is at least 185° F. The ravioli pieces and meat sauce, both of which are at a temperature of 185° F. or above, are filled into glass jars in an amount sufficient to provide a ratio of about 30 parts of ravioli per 70 parts of meat sauce, so that the meat sauce completely covers and surrounds the ravioli pieces. The filled jars are then sealed, inverted and heated in hot water or steam at a temperature of at least 190° F. for 13 minutes. The jars are then cooled to 110° F. or below by quenching in water.

The ravioli product thus produced is commercially sterile, and has a mass average pH of about 4.45 immediately after production and 24 hours after production. The pasta portion of the product has a desirable firm texture.

While the invention has been particularly described and illustrated with reference to a three-component product, that is, acidified pasta, acidified meat and acidified sauce, it is to be understood that products of the present invention may be formulated and produced with only two components, namely acidified pasta and an acidified liquid phase such as sauce, gravy, dressing, and the like. Such products include, for example, a cheese filling for various pasta products such as ravioli, manicotti, cannelloni, etc. with an acidified cheese sauce.

What is claim is:

1. A process for producing commercially sterile, hydrated pasta-containing product containing a pasta component having a firm texture, and a liquid sauce component which comprises forming an acidified pasta dough by mixing a farinaceous material selected from the group consisting of semolina, durum flour, farina, flour, and mixtures thereof, sufficient edible acid to provide the pasta dough with a pH of less than 4.6, from 2–20% by weight of gluten, from 3–25% by weight of an egg material selected from the group consisting of whole eggs, egg white and egg yolk, from 0–5% of glyceryl monostearate, and sufficient water to provide an acidified dough have a moisture content of from 25%–38%, forming the acidified dough under pressure into a pasta component selected from the group consisting of spaghetti, macaroni, noodles and sheets, preparing a liquid sauce component having a pH of below 4.6, heating the pasta component and the sauce component to a temperature of at least 185° F. and combining said components, while at a temperature of at least 185° F., in a container so that the sauce component surrounds the pasta component, sealing the container, and heating processing the sealed container under atmospheric conditions to provide a sterilizing value equivalent to about 10 minutes at 200° F., whereby the contents of the container are rendered commercially sterile without adversely affecting the taste, texture or appeaance of the pasta.

2. The process defined in claim 1 in which the sauce component contains acidified meat which is prepared by blanching ground meat particles in a hot aqueous solution of an edible acid for a period of time sufficient to reduce the pH of the meat particles to below 4.6, and adding flavoring and spices to the hot acid solution containing the acidified meat particles to thereby provide a meat containing sauce having a pH of below 4.6.

3. The process defined in claim 1 in which the acidified pasta dough is formed under pressure into sheets which are combined with acidified ground meat having a pH of below 4.6 to form ravioli pieces having a pH of less than 4.6.

4. The process defined in claim 2 in which an aqueous solution of an edible acid having a pH of 3.5 or below is contacted with ground cooked meat and mixed for a period of time sufficient to reduce the pH of the meat particles to below 4.6, thereby providing said acidified meat.

5. The process defined in claim 1 in which the acidified pasta dough is extruded through a die to form spaghetti strands having a pH of less than 4.6 and dried to a moisture content of about 12%.

6. The process defined in claim 5 in which the acidified dried spaghetti is heated in sufficient hot water to rehydrate and cook the spaghetti, and the rehydrated spaghetti is heated to a temperature of at least 185° F. prior to combining with the sauce component.

7. The process defined in claim 1 in which an acidified meat component, having a pH of below 4.6, is combined with the acidified pasta and sauce components in the container.

8. The process defined in claim 7 in which the acidified meat component is in the form of meatballs which are prepared by adding to a meat emulsion an edible acid encapsulated with an edible fat having a melting point of between about room temperature and 150° F., in an amount of about 0.75%–2.5% by weight of the emulsion, heating the emulsion to a temperature above the melting point of said edible fat, forming the meat emulsion into meatballs and heating the emulsion at a temperature and for a period of time sufficient to set the emulsion and release all of the acid into the emulsion.

9. The process defined in claim 1 in which an edible acid and a high acid food are included in the sauce phase to provide the sauce with a pH of below 4.6.

* * * * *